Dec. 5, 1944.   H. A. SCOTT   2,364,167
METHOD OF CURING RUBBER
Filed May 31, 1941
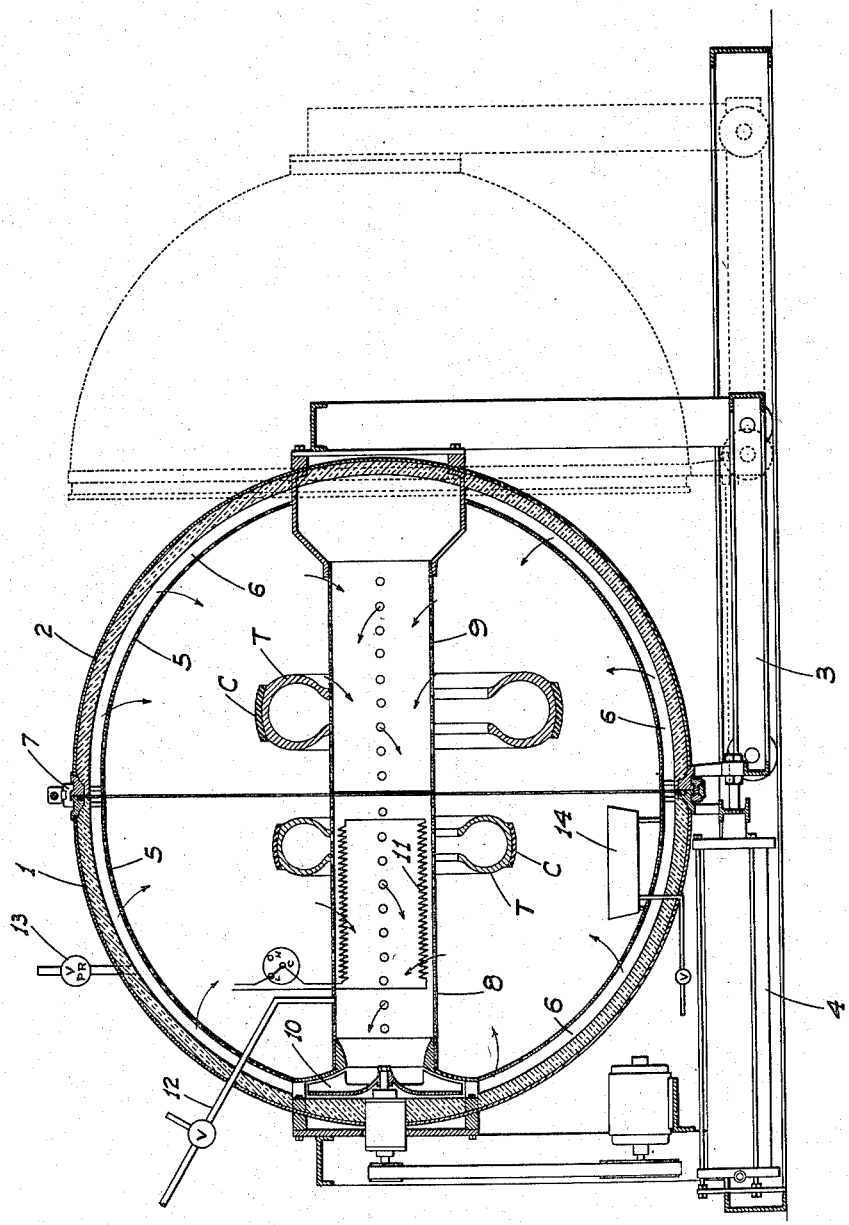
INVENTOR.
*Harry A. Scott*
BY
*Webster & Webster*
ATTORNEY.

Patented Dec. 5, 1944

2,364,167

UNITED STATES PATENT OFFICE 2,364,167

METHOD OF CURING RUBBER

Harry A. Scott, Omaha, Nebr., assignor to Super Mold Corporation of California, a corporation Application May 31, 1941, Serial No. 395,914

2 Claims. (Cl. 18—53)

This invention relates to the curing or vulcanizing of rubber forming initial parts of or applied as repairs to rubber goods of all kinds, the method being here shown and described in connection with the curing of new threads or recaps on tires.

The major object of my invention is to provide a method of curing rubber articles, and particularly tires, such that even pressure and temperature are applied simultaneously over the entire area of the tire, both inside and out for the duration of the curing period, so that there is no change in contour of the tire or any distortion thereof from unevenly applied pressure, or imperfect cure due to unevenly applied heat.

As a result of the use of this method, the use of a matrix or mold in which to confine the tire, an air bag in the tire to provide the required internal pressure, a rim on which to first mount the tire, and pressure plates or the like to engage a tire being cured, are rendered unnecessary. The time and labor operations in connection with tire curing are thus materially reduced.

A further object of the method is to supply only sufficient moisture to the tire to the extent which is beneficial to the rubber, and to restore the moisture dried out of the tire with use.

In general, my method enables curing operations, including preparation of the tires for curing, to be more quickly and easily effected, with extremely efficient results, than is possible with molds and similar equipment as used at present, and which enables a single piece of apparatus to be used in carrying out the method on tires or other articles of a large range of sizes, or a number of such different sized articles simultaneously.

The above objects are carried out with the aid of apparatus preferably such as that shown in the accompanying drawing, the figure on which is a sectional elevation, somewhat diagrammatic as to certain features, of such apparatus. A sufficient description of the apparatus will now be given so that carrying out the method with its use will be readily understood.

Such apparatus as shown comprises a substantially spherical curing vessel formed of a stationary shell section 1 and a movable shell section 2 mounted on a roller carriage 3 for movement horizontally to and from the fixed section; the line of separation of the sections being in a vertical plane.

A power cylinder unit 4 controls the movement of section 2. Both sections are heavily insulated for heat retention, and each is provided with a freely perforated inner wall 5 spaced from the insulation and arranged so as to form a continuous or endless air passage 6 between the wall and insulation when the sections are closed.

The shell sections when closed are releasably retained in pressure tight relation by a suitable radially expansible locking band unit 7.

Projecting diametrally and horizontally across the vessel are alined perforated conduits 8 and 9, the former being in section 1 and communicating with adjacent portion of passage 6 and the latter being in section 2 and communicating only with the interior of the vessel. Both conduits are open at adjacent ends, and when sections 1 and 2 are closed, they form a practically unbroken passage. The diameter of the conduits is less than the rim size of any tire.

Interposed in and between passage 6 and conduit 8 is a driven fan 10 whose intake connects with conduit 8 and which discharges into passage 6. Thermostatically controlled electric heating elements 11 are disposed in conduit 8, and a valved gas pressure supply and exhaust pipe 12 leads to said conduit from a source of pressure outside the vessel. A pressure relief valve 13 connected to the vessel prevents excessive pressure developing in the vessel.

A water pan 14 is disposed in the bottom of section 1, the water being supplied to a certain amount for any curing operation, from a valved pipe as shown. The diameter of the vessel sections is such that a considerable number of tires of different sizes may be supported in side by side relation on the conduits 8 and 9.

In operation, the camelback C is first applied to the tires T in any suitable manner, and such tires are then hung on the conduits 8 or 9, the vessel sections being first of course opened or separated to allow this to be done. Also water to an amount approximating 3% of the gross weight of the tires is admitted to the pan 14. The sections are then closed and clamped together.

A dry gas under pressure and at normal temperature is then admitted to the vessel to quickly bring the internal pressure to approximately 60 pounds. The heating elements are then energized to raise the internal temperature to approximately 294° F. (the usual curing heat) which has the effect of also raising the gas pressure to approximately 100 lbs.

It is important that the tire shall be placed under pressure before any heat is applied, in order to prevent the "working" of the rubber accelerator which would occur due to such heat and with an absence of pressure, and which would tend to create a porous condition in the rubber.

At about the same time, the fan 10 is started, causing the confined gas to be circulated from the conduits 8 and 9, through passage 6 and into the vessel and back into the conduits, being thus constantly drawn over the heating elements and distributed in its heated condition over the entire interior of the vessel so that it comes in even contact with the outside as well as the inside of the suspended tires throughout their area. The tire surfaces are also of course evenly subjected to the pressure of the air within the vessel. No distortion or change of contour of the tires is therefore possible, while the pressure thus being applied from the start of the curing operation prevents the new rubber from becoming porous.

When the heat is applied, the water in the pan becomes vaporized and humidifies the circulating gas, the moisture therein as it contacts the tires being mostly absorbed into the fabric thereof. Tires when made contain an appreciable amount of moisture, which becomes dried out with use of the tires. My method therefore, instead of drying out the tires even more, restores their normal moisture content. At the same time, if the proper amount of water is placed in the pan at the start, there is no appreciable moisture residue left when the cure is finished, and the bad effects due to excessive moisture in contact with the tire during the cure are avoided, and no water or steam condensate penetrates under the tread tending to blow the same off when the pressure is subsequently relieved.

My method thus has great advantages over the use of steam as the pressure and heating agent, since the heat, pressure and moisture are independent of each other, and can be regulated independently of each other. With steam, on the other hand, a pressure sufficient for proper adhesion of the camelback and old tire rubber necessarily provides such heat as to be excessive and burn the tire and prevent a proper cure; or if the heat is kept down to the required amount, the pressure is insufficient.

The heated gas is circulated for a period sufficient to give a proper cure as experience dictates, and the heat and fan are then shut off. The heat is then reduced while keeping the pressure up until the temperature has dropped to approximately 212° F. This is preferably done by forcing gas at high pressure and normal or low temperature into the vessel, and allowing excess pressure to escape from the relief valve 13 or exhaust pipe 12. After this reduced temperature has been reached, the pressure is gradually relieved until atmospheric pressure conditions obtain. This prevents the destructive action on the carcass and to the union therein of rubber and other materials, which a sudden pressure relief would give, and provides a gradual return to normal pressure conditions similar to that obtained with the use of a decompression chamber on workers operating under high pressure conditions.

When the pressure is fully relieved, the vessel is opened and the tires are removed. The tread design is then grooved into the new recap or tread by conventional means. This should be done while the tire is still hot, since the rubber while thoroughly cured is still soft and tends to lend itself more readily to the treatment.

While air may be used as the gas and pressure medium, it is preferable to use a gas having no free oxygen, such as $CO_2$, since free oxygen has a tendency to age the rubber, which is undesirable.

From the foregoing description it will be readily seen that I have produced such a method as substantially fulfills the objects of the invention set forth herein.

While this specification sets forth in detail the present and preferred manner of accomplishing the method, still in practice such deviations from such detail may be resorted to as do not form a departure from the spirit of the invention, as defined by the appended claims.

Having thus described my invention, what I claim as new and useful and desire to secure by Letters Patent is:

1. A method of curing tread rubber on tires comprising the steps of establishing an enclosed vulcanizing chamber, supporting and exposing a tire in said chamber, introducing a relatively small and predetermined quantity of water into said chamber with a surface of said water exposed, subsequently introducing a dry gas under pressure into the chamber, and then heating the gas to a vulcanizing temperature, the water evaporating at said temperature; and progressively raising the humidity within the chamber to a limited maximum extent.

2. A method of curing tread rubber on tires comprising the steps of establishing an enclosed vulcanizing chamber, supporting and exposing a tire in said chamber, introducing water into the chamber in an amount approximating three per cent of the gross tire weight in said chamber, a surface of said water being exposed within the chamber, subsequently introducing a dry gas under pressure into the chamber, and then heating the gas to a vulcanizing temperature, the water evaporating at said temperature; and progressively raising the humidity within the chamber to a limited maximum extent.

HARRY A. SCOTT.